United States Patent [19]

Doolin et al.

[11] Patent Number: 5,074,494
[45] Date of Patent: Dec. 24, 1991

[54] ELASTOMERIC SWASHPLATE CONFIGURATION FOR HELICOPTERS

[75] Inventors: Leonard J. Doolin, Southbury; Stephen V. Poulin, Stratford, both of Conn.

[73] Assignee: United Technologies Corporation, Hartford, Conn.

[21] Appl. No.: 598,470

[22] Filed: Oct. 11, 1990

[51] Int. Cl.⁵ ..................... B64C 27/35; B64C 27/605
[52] U.S. Cl. .................................. 244/17.25; 416/114; 416/134 A; 74/60
[58] Field of Search ............... 244/17.25, 17.11, 17.19, 244/17.21, 17.23, 17.27; 416/134 A, 114, 102, 107, 117, 148; 74/60

[56] References Cited

U.S. PATENT DOCUMENTS

| | | | |
|---|---|---|---|
| 3,558,082 | 1/1971 | Bennie | 244/17.25 |
| 3,841,586 | 10/1974 | Broadley et al. | 244/17.25 |
| 4,232,563 | 11/1980 | Peterson et al. | 416/114 X |
| 4,588,355 | 5/1986 | Ferris et al. | 416/114 |
| 4,688,993 | 8/1987 | Ferris et al. | 74/60 X |

Primary Examiner—Joseph F. Peters, Jr.
Assistant Examiner—Carla Mattix

[57] ABSTRACT

A swashplate configuration for a helicopter which eliminates the need for a uniball centering bearing and either a stationary or rotating scissors linkage through the use of elastomeric bearing assemblies consisting of a first stack of flat laminates oriented both vertically and radially with respect to the axis of the main rotor shaft and a second stack of spherical laminates having a center axis oriented radially with respect to the main rotor shaft axis and which reacts centering and torque loads through compression of the laminate stacks.

2 Claims, 3 Drawing Sheets

FIG.3
FIG.4
FIG.5
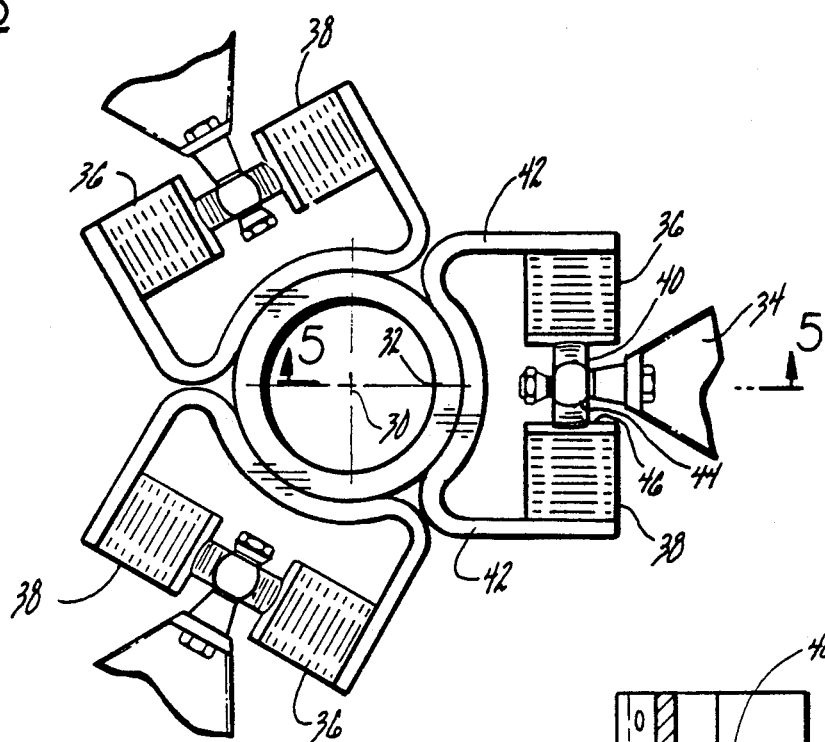
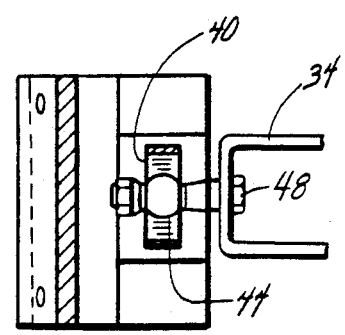
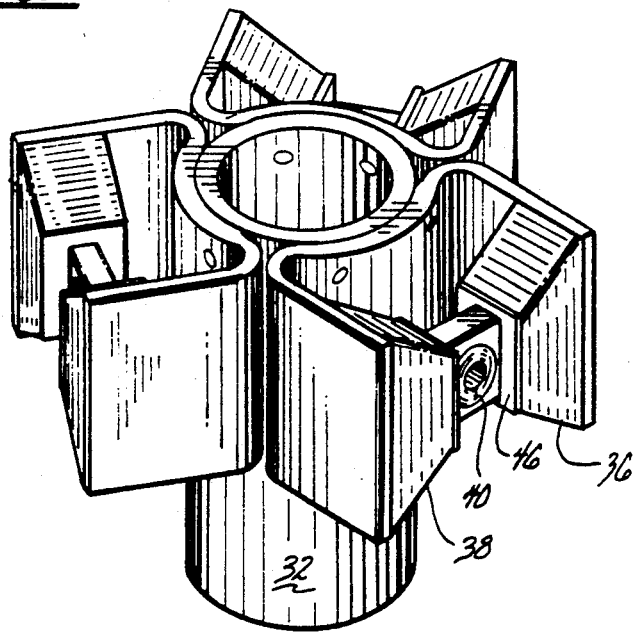

ELASTOMERIC SWASHPLATE CONFIGURATION FOR HELICOPTERS

TECHNICAL FIELD

This invention relates to helicopter swashplate configurations and more particularly to a swashplate configuration having an improved centering member capable of tilt and axial translation while maintaining circumferential positioning of a swashplate ring member or, in an alternative embodiment, driving torque to the swashplate ring member.

BACKGROUND ART

Blade pitch control in a helicopter main rotor typically is achieved through the use of a swashplate assembly for transmission of control inputs from the stationary control system to the rotating system. Typically a spherical mount (or uniball mount) centers one of the swashplate ring members and accommodates tilt and axial translation of the swashplate assembly. A scissors linkage is provided for driving or rotating a swashplate member with the main rotor shaft and for maintaining the proper alignment of the control rods which impart pitch motion to the rotor blades.

The rotating scissor linkage is comprised of two metal links pinned or hinged together at one end, and forming a V-shape. The opposing ends of the links are pin mounted to the rotor shaft at one end and articulately mounted by a ball and socket fitting to the rotating swashplate ring at the other end. The swashplate assembly has proven to be a very reliable and relatively maintenance-free configuration. In contrast, the rotating scissors linkage accounts for a relatively high percentage of the necessary repairs and maintenance associated with that portion of the control system involving the swashplate assembly and the rotor hub. The bearings of the scissors linkage, particularly the spherical bearing connection to the rotating swashplate ring, wears much more rapidly than other bearings in the swashplate assembly due to the large once per revolution angular motion the pivot bearings experience when the swashplate is tilted. Also, vibratory loads are induced due to small azimuthal motions of the swashplate induced by the geometric coupling of scissor and swashplate motions. Finally, Coriolis loads are applied with each revolution. This is due to the radial changes in the center of gravity of the scissors linkage as the linkage opens and closes, thus causing a change in angular momentum. Accordingly, the rotating swashplate ring accelerates and decelerates once per revolution thereby accelerating the rate of wear to the scissors linkage bearings. It is desirable, therefore, to provide a swashplate assembly which eliminates the need for a scissors linkage.

Patents directed to helicopter rotor drives and which do not include a scissors linkage include U.S. Pat. No. 3,558,082 and U.S. Pat. No. 4,588,355, the latter patent being assigned to Applicants' assignee.

SUMMARY OF THE INVENTION

An object of the invention is to provide a helicopter swashplate configuration having a centering member capable of tilt and axial translation and which eliminates the need for rotating scissors linkage or for fixing the position of a swashplate ring member.

Still another object of the invention is to provide a helicopter swashplate configuration having a centering member capable of tilt and axial translation through an elastomeric bearing having flat and spherical laminate stacks and which reacts torque principally through compression of the laminate stacks. As disclosed, the invention is related to the swashplate configuration described in the copending patent application of Hibyan et al, Ser. No. 07/598,469, filed the same day as the application and also assigned to Applicants' assignee.

The foregoing and other objects, features and advantages will be apparent from the specification and claims and from the accompanying drawings which illustrate an embodiment of the invention.

BRIEF DESCRIPTION OF THE DRAWINGS

FIG. 3 is an enlarged view of the centering member of the swashplate assembly.

FIG. 4 shows the elastomeric laminate stacks in greater detail.

FIG. 5 is a view along line 5—5 in FIG. 3.

DESCRIPTION OF PREFERRED EMBODIMENT

The configuration of the present invention is firstly described and depicted in terms of a swashplate assembly having an outer rotating ring member and an inner non-rotating (or stationary) ring member. Thereafter, the invention is described for applications where the inner ring member rotates and the outer ring is held stationary. Whereas the former implementation eliminates the requirement for a stationary scissors linkage, the latter eliminates the need for a driving or rotating scissors linkage. Both configurations eliminate the need for the uniball mount.

Figure 1:
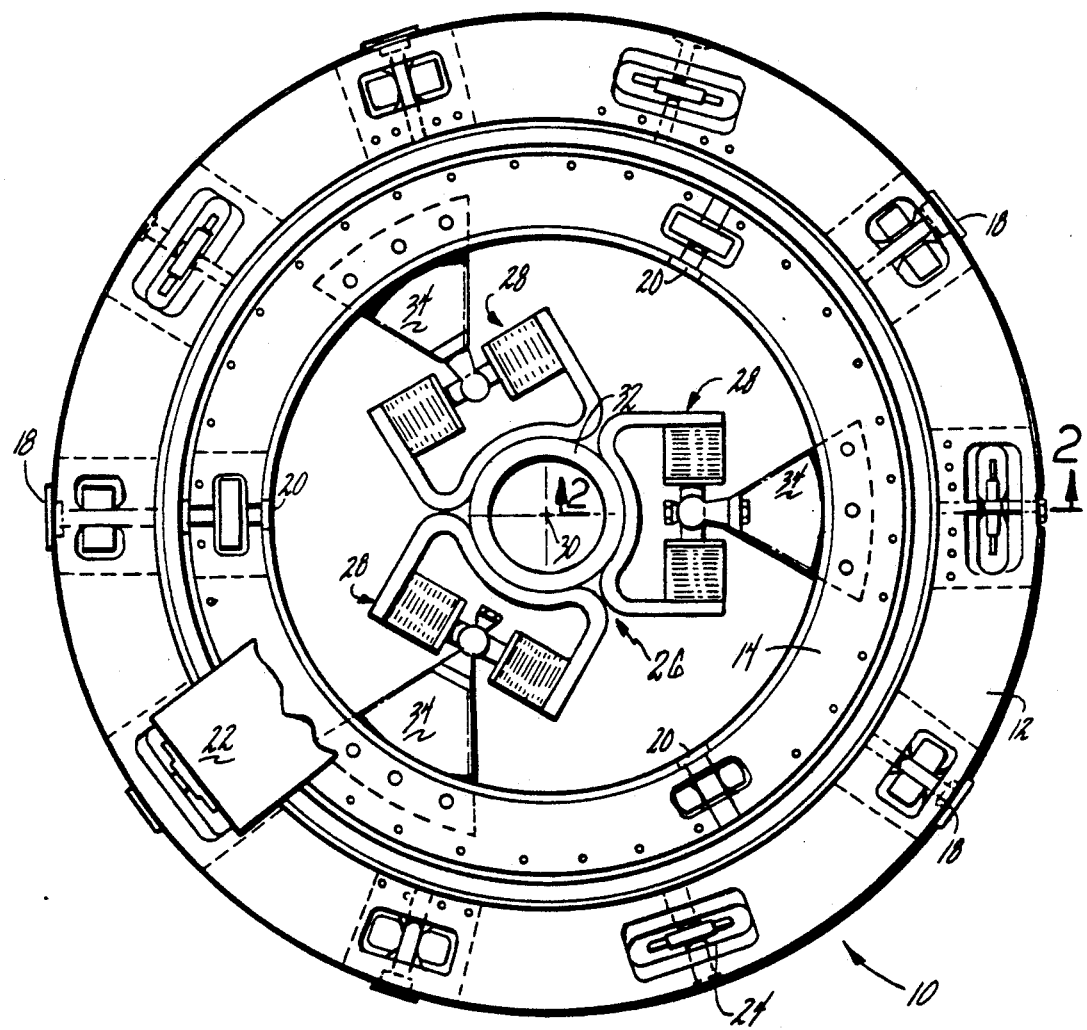
FIG. 1 is a plan view of a swashplate assembly in accordance with this invention.

In FIG. 1, swashplate assembly 10 is shown which provides pitch control inputs to the rotor blades, not shown, of a helicopter. The swashplate assembly includes outer ring member 12 circumscribing and rotating with the rotor blades and the main rotor shaft, and inner ring member 14 also circumscribing the rotor shaft and within outer ring member 12. The inner ring member is mounted to the outer ring member by duplex ball bearing 16, FIG. 2, which transfers vertical control loads between the two ring members and also permits relative rotation between the ring members. Outer ring member 12 is coupled to rotor blades by control rods, not shown, connected to the ring at pivot locations 18 around the ring. Inner ring member 14 is coupled to at least three control input actuators, not shown. The input actuators are connected to the inner ring member at pivot locations 20, and determine the planar tilt and axial position of the inner and outer ring members.

Figure 2:
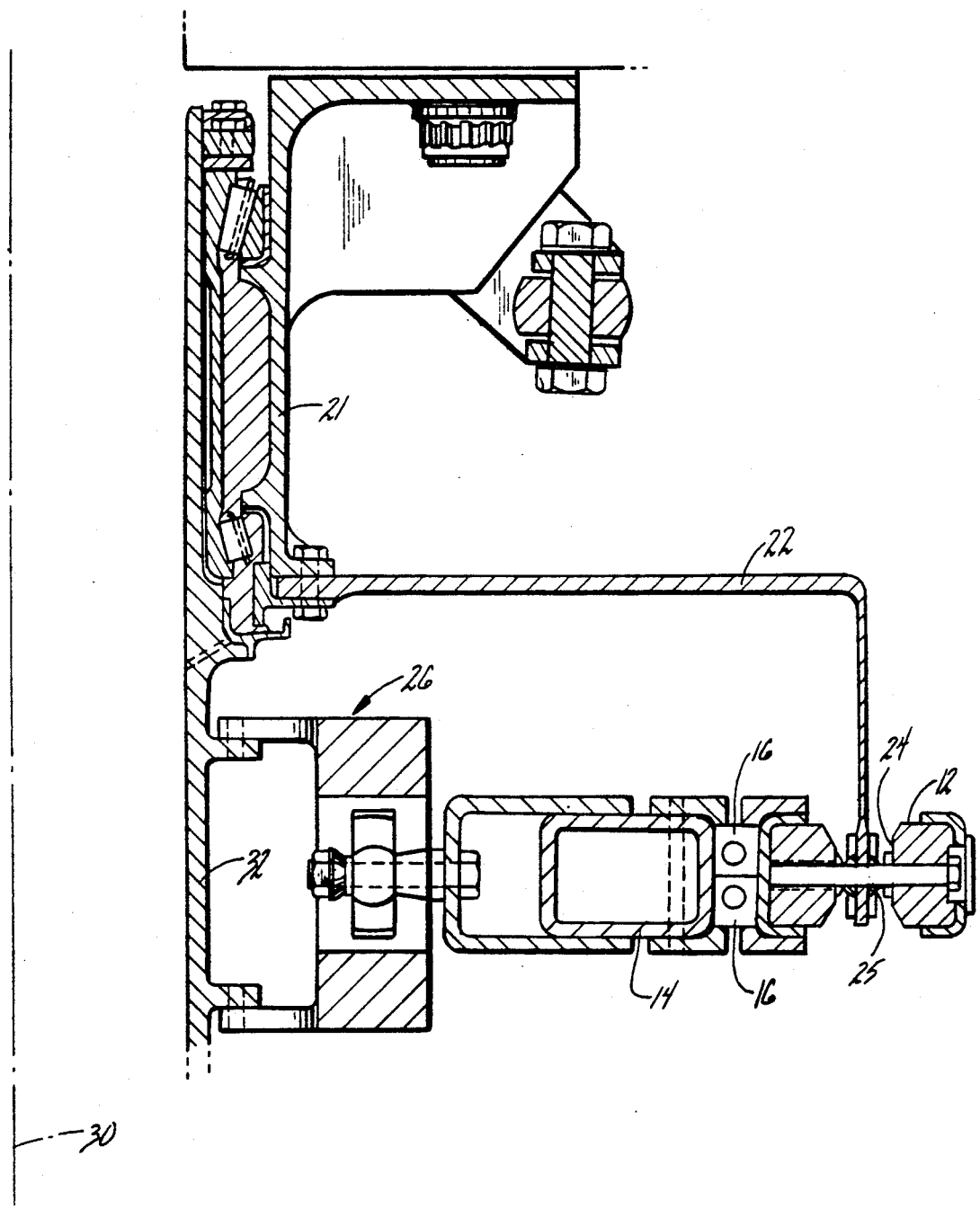
FIG. 2 is a section view of the swashplate assembly along line 2—2 in FIG. 1.

Outer ring member 12 is connected to main rotor shaft 21 by a plurality of flexi-straps 22 shown in FIG. 1 and FIG. 2. The flexi-straps are connected at their inner end to the rotor shaft and at their outer end to pivot 25 in slot 24 in the outer ring member.

Centering member 26 in the swashplate assembly includes at least three elastomeric bearing assemblies 28 equally disposed about rotor shaft axis 30. The centering member is affixed at its inner circumference to aircraft structure, in this case standpipe 32, and its outer portion is connected to inner ring member 14 by U-shaped radial member 34 extending from each elastomeric bearing assembly to the ring member.

Referring to FIG. 3, each elastomeric bearing assembly 28 has a dual laminate configuration including a first stack of flat laminates 36,38 oriented in a plane parallel to and at a radial distance from the rotor shaft axis, and a second stack of spherical laminates 40 oriented about a central axis radial to the rotor shaft axis. The flat laminates have outer bearing race 42 integrally connected to standpipe 32 and the spherical laminates have bearing race 44 connected to radial member 34 which is connected to inner ring member 14. The flat and spherical laminates are joined by intermediate bearing race 46 which serves as an inner race for the flat laminates and includes a connecting portion containing the spherical laminates and serving as an outer race therefor.

FIG. 4 is an enlarged view of the elastomeric bearing assemblies showing particularly the forms of flat laminates 36 and 38, and intermediate bearing race 46.

FIG. 5 is a section along line 5—5 in FIG. 3 and shows in more detail the connection of spherical laminates 40 to radial member 34. Bolt 48 extending through the base of U-shaped radial member 34 and race 44 provides the connection.

The elastomeric bearing assemblies, in a centering member affixed to stationary aircraft structure so that inner ring member 14 remains centered about the shaft axis of rotation and does not rotate, however does react torque and centering loads of outer ring member 12 through compression of the flat and the spherical laminate stacks, accommodate axial translation of ring members 12 and 14 through shear of the flat laminate stacks, and accommodate tilt displacement through shear of the flat laminate stacks along with angular shearing of the spherical laminates.

The centering device of the present invention is also capable of driving torque in an arrangement which eliminates the need for rotating scissors linkages. In this arrangement the control input actuators which are connected to inner ring member 14 in the arrangement described above are connected instead to outer ring member 12 and flexi-straps 22 are eliminated. Also, the control rods which are connected to outer ring member 12 in the arrangement described above are connected instead to inner ring member 14. Centering member 26 would be affixed to and driven by rotor shaft 21 rather than being held in a fixed position by being affixed to standpipe 32. In this embodiment, the outer ring is held stationary and the inner ring is driven or rotating. Thus, elastomeric bearing assemblies 28 would transmit torque loads through compression of the flat and the spherical laminates, accommodate axial translation of ring members 12 and 14 through shear of the flat laminate stacks, and accommodate tilt displacement through shear of the spherical laminate stacks.

Each configuration of the invention has the desirable structural arrangement of reacting centering loads and torque transfer through compression of the elastomeric bearing laminate stacks and without shear of the stacks.

It should be understood that the invention is not limited to the particular embodiments shown and described herein, but that various changes and modifications may be made without departing from the spirit or scope of this concept as defined by the following claims.

We claim:

1. A swashplate construction for a helicopter in which the swashplate includes an outer ring member, an inner ring member and a centering member surrounding the rotational axis of the helicopter main rotor, said centering member being connected to said inner ring member by a plurality of elastomeric bearing assemblies, each of said bearing assemblies including a first stack of flat laminates and a second stack of spherical laminates, said flat laminates being oriented in a plane parallel to and at a radial distance from said rotational axis and said spherical laminates being circular in form and having a central axis radial to said rotational axis, said first stack of flat laminates having an outer bearing race affixed to aircraft structure, said second stack of spherical laminates having a bearing race connected to said inner ring member along said central axis, and an intermediate bearing race which is the inner race for said second stack of spherical laminates connecting said first and second stack of laminates.

2. A swashplate construction in accordance with claim 1 in which the first stack of flat laminates includes a pair of laminate stacks and the second stack of spherical laminates is mounted between said pair of flat laminates.

* * * * *